(12) United States Patent
Gramespacher et al.

(10) Patent No.: US 7,170,004 B2
(45) Date of Patent: Jan. 30, 2007

(54) SURROUNDING BODY FOR A HIGH VOLTAGE CABLE AND CABLE ELEMENT, WHICH IS PROVIDED WITH SUCH A SURROUNDING BODY

(75) Inventors: Hansjoerg Gramespacher, Niederrohrdorf (CH); Felix Greuter, Rutihof (CH); Michael Hagemeister, Zurich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 10/504,539

(22) PCT Filed: Jan. 29, 2003

(86) PCT No.: PCT/CH03/00073

§ 371 (c)(1),
(2), (4) Date: Aug. 13, 2004

(87) PCT Pub. No.: WO03/069752

PCT Pub. Date: Aug. 21, 2003

(65) Prior Publication Data

US 2005/0139373 A1 Jun. 30, 2005

(30) Foreign Application Priority Data

Feb. 18, 2002 (EP) .................. 02405124

(51) Int. Cl.
*H02G 15/18* (2006.01)

(52) U.S. Cl. .............. 174/73.1; 174/84 R; 174/DIG. 8; 428/34.9

(58) Field of Classification Search ............... 174/73.1, 174/84 R, DIG. 8; 428/34.9
See application file for complete search history.

(56) References Cited

U.S. PATENT DOCUMENTS

| 4,418,240 A | 11/1983 | Chazelas |
| 6,124,549 A * | 9/2000 | Kemp et al. ............... 174/73.1 |
| 6,171,669 B1 * | 1/2001 | Vallauri et al. ............. 428/34.9 |

FOREIGN PATENT DOCUMENTS

| EP | 0875087 B1 | 11/2000 |
| WO | WO 00/74191 A1 | 12/2000 |

* cited by examiner

*Primary Examiner*—Jinhee Lee
(74) *Attorney, Agent, or Firm*—Buchanan Ingersoll & Rooney PC

(57) ABSTRACT

The surrounding body (1) serves to surround the end, a branching or a connecting point of a high-voltage cable. It has an element (3) with a nonlinear current-voltage characteristic line, which serves to control the electric field in the surrounding area. The field control element (3) contains a polymer and a filler embedded in the polymer und containing microvaristors, as well as at least a hollow body section extending along an axis (2) and designed flat, with an axially symmetrical inner surface conductive by deforming the surrounding body (1) to an outer surface of the cable. To ensure good field control in cables, which are operated at high voltages, the inner surface of the hollow body section is designed as a variation of the outer surface of the cable and in such a way that the field control in the surrounding area is achieved by altering the number of microvaristors per surface unit as a result of expansion and/or shrinking of the hollow body section after deforming.

21 Claims, 2 Drawing Sheets

SURROUNDING BODY FOR A HIGH VOLTAGE CABLE AND CABLE ELEMENT, WHICH IS PROVIDED WITH SUCH A SURROUNDING BODY

TECHNICAL FIELD

The present invention relates to the field of a body for surrounding the end, a branching or a connection point of a high-voltage cable. The invention also relates to a cable element, in particular a cable end seal of a cable sleeve, fitted with such a surrounding body.

The surrounding body contains at least one field control element based on a polymer and filler embedded in the polymer and containing microvaristors. The field control element is characterised by a nonlinear current-voltage characteristic and has at least one axially elongated and flat-shaped hollow body section which has an axially symmetrical inner surface that can be applied or guided to an outer surface of the cable by deforming the surrounding body.

Basically, the surrounding body can be assigned to two classes of surrounding bodies. The surrounding bodies assigned to one class contain electrically conductive elastomers as field control element—as a rule filled with soot. With these elastomers the field-controlling effect is achieved by the geometric shaping, such as e.g. a funnel-shaped opening. This type of field-control is designated as geometric field-control. The surrounding bodies assigned to the other class contain as field control element polymers, in which fillers with field-controlling properties are embedded. These field-controlling material properties can e.g. be achieved by relatively high dielectric constants or by nonlinear, i.e. field strength-dependent, electrical resistances or by a combination of both. The advantage of this type of field control elements is that they can consist of thin-walled, cylindrical pipes or hoses and therefore thin, spce-saving and thus also cost-effective products can be produced.

BACKGROUND

A surrounding element of the type initially described, which is used in manufacturing an end seal of a shielded synthetic-insulated single-conductor cable with operating voltages of 10 kV or 20 kV, respectively, is described in EP 0 875 087 B1. To produce a cable head of a 20 kV cable on a cable end, at first wires of a cable shielding are removed from a cable insulation provided between a cable conductor and the shielding and are fixed to form a coil of wires, i.e. wires having a common ring-like edge. A conductive layer, e.g. a graphite coating, on the cable insulation is removed as far as an offset edge projecting over the coil of wire. Then the cable insulation provided on the end of the cable conductor is removed and a field-controlling, tubular surrounding element is placed onto the cable end. This surrounding element is formed by a field control element made of a polymer and a microvaristor based on filler containing doped zinc oxide and by an outer layer surrounding the field control element coaxially made of heat-shrinkable insulating material. With its one end the field control element contacts the end of the conductive layer guided as far as the offset edge. The other end of the field control element is guided out over the offset edge to the cable insulation and, depending on the control task, can be connected to the open end of the cable conductor, or can also end on the cable insulation without connection to the cable conductor.

The structure and properties of a field control element used in the above-mentioned surrounding element are described in detail in a publication by R. Strümpler et al. "Smart Varistor Composites", Proceedings of the 8th CIMTEC Ceramic Congress and Forum on Materials Symposium (1994). The field control element is designed as composite material and is filled with a ceramic material, consisting of small—substantially spherical—ZnO particles. The ZnO particles are doped with different metal oxides, such as e.g. $Sb_2O_3$, $Bi_2O_3$, $Cr_2O_3$ and $Co_3O_4$ and are sintered at temperatures of between 900° C. and 1300° C. Like a varistor the sintered particles have nonlinear electrical properties that depend on the electrical field strength. In the case of low field strengths the particles behave like an insulator, and with increasing field strength the particles become more conductive. Owing to these nonlinear electrical properties the polymer composite material has good field-control properties.

A further surrounding body for surrounding a connection point of two high voltage cables having different diameters is described in U.S. Pat. No. 6,171,669. This surrounding body has on its inner side a layer of field control material. This layer is guided on both cables in each case to a transition area which is arranged between the associated cable insulation and a layer made of semiconductive material.

SUMMARY OF THE INVENTION

The object of the invention, as specified in the claims, is to provide a surrounding body of the type initially described, which enables very precise field-control of a cable element, such as in particular of a cable head or a cable sleeve in a particularly simple manner.

With the inventive surrounding body the inner surface of the hollow body section is designed differently from the outer surface of the cable in such a way that the field control is achieved by changing the number of microvaristors per surface unit as a result of expansion and/or shrinkage of the hollow body section after the deforming. The electrical properties of the field control element depend substantially on the mutual distance of the microvaristors in the polymeric matrix or on the proportion of microvaristors. Thus e.g. the dielectric constant grows with increasing concentration of microvaristors, in particular those based on a ceramic, such as ZnO, and vice versa the electrical resistance generally drops with a given field strength with increasing filler concentration. If the field control element is now expanded/shrunk during the production of a cable element, for example a cable head or a cable sleeve, then the mutual distances of the microvaristors increase/decrease in circumferential direction of the field control element with the expansion/shrinkage, or, respectively, the number of microvaristors per unit area of the flat designed hollow body section increases/decreases and the electrical properties of the field control element change accordingly. This fact is capitalised on by the inventive surrounding element in a favourable manner to produce locally differing electrical properties, such as in particular dielectric constant and electrical resistance, through different local expansion and/or shrinkage of the hollow body section along the axis. Thus, apart from the parameters related to the material of the microvaristors, such as e.g. filler content, composition, sintering conditions as well as geometric dimensions, one obtains an additional design parameter to optimise the field-control properties in the cable element provided with the inventive surrounding body by establishing the expansion/shrinkage ratios along the hollow body section of the field control element. Therefore, the inventive surrounding element can also be used in cables in voltage range of far over 100 kV.

At the same time the field control element and thus also the surrounding body have a thin wall thickness. A cable element fitted with the inventive surrounding body and provided for high-voltage applications is characterised by a slender design, in spite of having optimised electrical properties. This also gives rise to other advantages, such as:

a) Smaller footprint. This is particularly significant with connections in gas-insulated high-voltage facilities (GIS plant), because with thinner cable elements, such as end seals, smaller pipe diameters in the GIS plant become possible, as well.

(b) Less material requirement. In the case of thinner field control elements thinner cable elements for external applications are also possible. Because these days a large quantity of insulating material is often needed due to the length in external applications, material can be saved using thinner cable elements and installation costs can be reduced.

(c) Greater application range with different cable diameters. Because with thinner cable elements the effort required for pushing it onto a cable are generally less than for cable elements with geometric field-control, these cable elements can be dimensioned such that one size can be used for several cable diameters.

Before the surrounding body is placed on the cable the inner dimension of the hollow body section can change continuously along the axis. When the surrounding body is withdrawn to a section of the cable designed as a cylinder or flat band, the preferred expansion/shrinkage for the desired electrical properties of the field control element is achieved.

Basically, it is also possible, however, that before the surrounding body is placed on the cable the inner dimension is kept constant along the axis. The preferred expansion/shrinkage for the desired electrical properties of the field control element is then achieved by designing the mantle surface of the cable or the cable insulation, respectively, such that this expansion/shrinkage is caused.

It is recommended that an inner diameter determining the dimensions of the inner surface changes along the rotation axis continuously, preferable montonously, in particular linearly. Since the inner surface of the inventive surrounding body is then designed predominantly conically, a casting core used in a casting procedure for producing a surrounding body can be removed comparatively easily.

In order to solve simple field control tasks it is sufficient, if the inner diameter of the hollow body section changes linearly along the axis of rotation. Here, but also in solving complicated field control tasks, the ratio of the minimum inner diameter to the maximum inner diameter of the hollow body section should appropriately be 0.2 to 1.0 times.

An additional field-control improvement is achieved by changing the electrical resistance or the impedance in that, in addition to the inner dimension, also the wall thickness of the hollow body section changes along the axis. By way of example, also the cross-section surface decreases with diminishing wall thickness and therewith the resistance parallel to the axis increases. The wall thickness can also be correspondingly large in certain areas, preferably where a larger electrical conductivity is desired, for example directly on the offset edge.

In a simple manner in manufacturing-engineering terms the field control element can be formed in an inner surface of an elastically deformable support element made of insulating material.

Instead of only one first field control element formed in the support element at least one additional field control element can be formed in the support element. To achieve good field-control also at high voltages, for example at voltages over 100 kV, the other field control element should enclose the first field control element and be separated from the latter by an electrically insulating intermediate layer.

Polymers, in which primarily spherical particles formed as microvaristors by sintering metal-oxide-doped zinc oxide granulate are embedded, are particularly suitable as material for the first field control element and the optionally provided additional field control element. The microvaristors can also comprise microvaristors based on doped $SnO_2$, $TiO_2$, $SrTiO_3$ or SiC in each case singly or in a mixture. Through different filler concentrations, selection of filler and/or sintering conditions the electrical properties of the field control elements can be altered substantially. Thereby and through selection of at least two field control elements, which have different electrical properties and/or dimensions, the inventive surrounding body can solve a plurality of field control tasks with particularly keen precision.

It is recommended to also embed electrically conductive particles in the polymer apart from the microvaristors as filler, since on the one hand high energy absorption of a cable element, for example a cable head, fitted with the surrounding element is ensured, and since on the other hand the dielectric constant of the field control element is increased by the particles, that are formed preferably as metal flakes or graphite, in a particularly advantageous manner for solving specific field control tasks. To achieve a high energy uptake and an efficient raising of the dielectric constant the electrically conductive particles provided in the filler should make up approximately 0.05 to approximately 5 volume % of the filler. They can also be applied directly to the microvaristors for the purpose of simplifying the production of the surrounding body.

In a cable element configured preferably as a cable head or cable sleeve with a cable section, which comprises a cable conductor that can be used at high-voltage potential, an electrically conductive cable shielding and a cable insulation arranged between cable conductor and cable shielding, and with an inventive surrounding body being attached to the cable section, a good field control can be achieved, if the first field control element comprises a changed number of microvaristors per unit area in a first section, that encloses an offset edge of a layer of the cable shielding and an unshielded area of the cable insulation, compared to a second section connecting to the first section and comprising a shielded area of the cable insulation. To achieve good field control for voltages in the region of several 10 kV up to a several 100 kV and in particular for direct-current applications, the field control element should connect the cable shielding and the cable conductor to one another.

With higher voltages, a particularly good field control is achieved if the field control element and an additionally provided outer field control element, which surrounds the other field control element coaxially, are guided in an axial direction over the offset edge of the cable shielding and are connected only to the cable shielding. This advantageous effect is likewise achieved if the outer field control element is held on floating potential. For certain applications, in particular in high-voltage applications, it can be an advantage if a further outer field control element is connected directly to the conductor being on high-voltage potential.

The above-described effect can still be improved considerably if in addition an electrically conducting layer is arranged between both field control elements, and is connected electrically conductively to the outer field control element.

For reasons of reproducible production of a dielectrically high-grade cable element it is recommended to apply an annular layer made of electrically conductive material to the inner surface of the hollow body section of the inner field control element, which layer extends in the direction of the axis of rotation over the offset edge. These measures bring about a pressure release of the dielectrically critical area around the offset edge. This is an advantage to the extent that in contrast to the offset edge this annular layer is produced not on the assembly site, but in a manufacturing facility, and is thus designed to be dielectrically particularly high-grade.

BRIEF DESCRIPTION OF THE DRAWINGS

Exemplary embodiments of the invention will now be explained with reference to diagrams, in which.

DETAILED DESCRIPTION OF THE PREFERRED EMBODIMENTS

Figure 1:
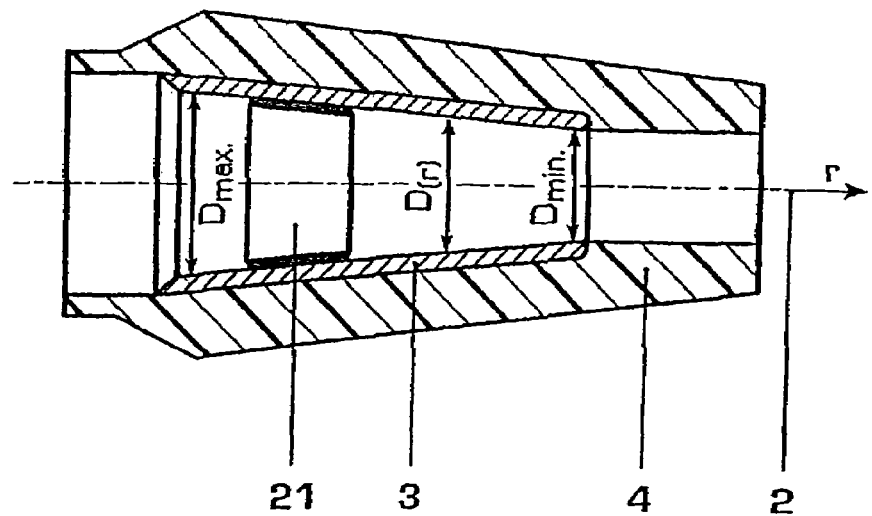
FIG. 1 is a top view of the axial cross section through a first embodiment of a rotationally symmetrically configured surrounding body according to an embodiment of the present invention.

In all figures the same reference numerals refer to identically functioning parts. A hollow surrounding body 1 shown in FIG. 1 is designed rotationally symmetrically and has a field control element 3 made of a material having elastomeric, nonlinear electrical properties and designed substantially as a hollow truncated cone and extended along an axis of rotation 2 in the direction of a coordinate r. The material contains apart from elastomer also microvaristors embedded in the elastomer as matrix, which microvaristors are advantageously formed by doped and sintered zinc oxide particles. Typical compositions, particle sizes and sintering conditions can be inferred from the initially mentioned prior art. The field control element 3 is formed in an inner surface of a likewise elastomeric hollow support element 4, though consisting of an insulating material. Silicones, EPDM, natural rubber, nitrile rubber, thermoplastic elastomers or mixtures of various elastomers can be used as elastomers. The inner diameter D(r) of the field control element decreases along the axis of rotation 2 in the direction of the increasing coordinate r. Accordingly, the elastomeric field control element is expanded differently when pushed onto a cable end along the axis of rotation 2 and the electrical properties of the pushed-on field control element 3 then depend on the position on the cable.

Figure 2:
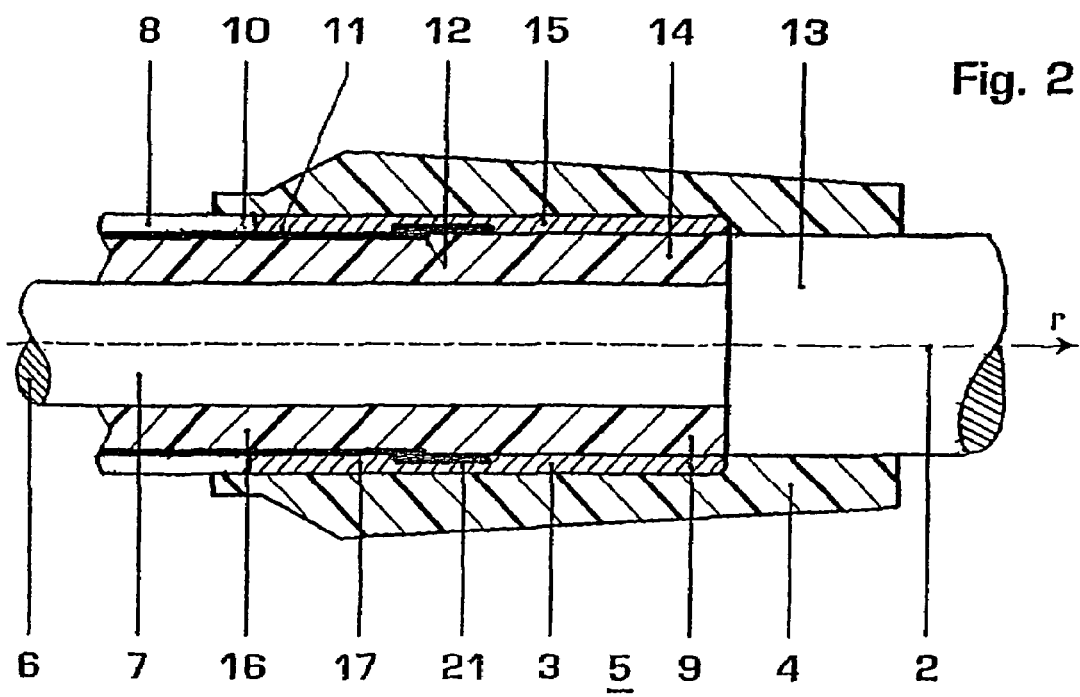
FIG. 2 is a top view of an axial cross section through a cable head fitted with the surrounding body according to FIG. 1.

This can be seen from FIG. 2. In this figure a cable head 5 for a cable conducting operating voltages of a few 10 kV is illustrated. The cable has a cable section 6 with a cable conductor 7 conducting the voltage, an electrically conductive cable shielding 8 and cable insulation 9 arranged between the cable conductor 7 and the cable shielding 8. The cable shielding 8 contains wires, which are removed from the cable insulation 9 and are fixed at the right end of the cable shielding, forming a coil of wire 10. An electrically conductive coating 11 provided on the cable insulation 9 is stripped off as far as an offset edge 12 projecting over the coil of wire 10. The cable conductor 7 bears at its end a cable shoe 13. The surrounding body 1 is attached to a mantle surface formed by the cable shielding 8, the coating 11, an unshielded area 14 of the cable insulation 9 and the cable shoe 13, and in such a way that the field control element 3 connects the coating 11 over the offset edge 12 to the cable shoe 13 lying on the potential of the cable conductor 7 and that the support element 4 occludes the cable section 6 fluid-tight. The inner diameter of the field control element 3 is evidently stretched more strongly in a section 15 enclosing the offset edge 12 and the unshielded area 14 of the cable insulation 9 than in a section 17 attached thereto and including a shielded area 16 of the cable insulation.

In the embodiment according to FIGS. 1 and 2 the inner diameter D(r) of the field control element 3 is linearly expanded along the axis of rotation 2 after production of the cable head is completed. The change in diameter may, however, take any other form and need also not extend over the entire length of the hollow field control element 3, but possibly only over a preset section. If the maximum inner diameter of this hollow body section is designated by $D_{max}$ and if the minimum inner diameter is designated by $D_{min}$ (FIG. 1), the ratio $D_{min}/D_{max}$ can be between 0.2 and 1 with a given end seal. The expansion of the field control element 3 at the point with the minimum inner diameter $D_{min}$ can be between 2% and 80% after installation on the cable. Accordingly, the number of microvaristors per unit area of the field control element 3 is decreased and thus the electrical resistance and the dielectric constant of the field control element 3 at this point have changed compared to the resistance and the dielectric constant at the point with the maximum inner diameter $D_{max}$. These changes in resistance and dielectric constant considerably benefit the field control of the cable end seal.

It is evident from FIG. 2 that the field control element 3 constitutes a through connection, such that earth potential and high-voltage potential are connected. This is an advantage for solving certain control tasks, in particular in the voltage range of up to several 10 kV and in the case of direct-current applications. Basically the field control element 3 can also be kept potential-free at one of its two ends.

Figure 3:
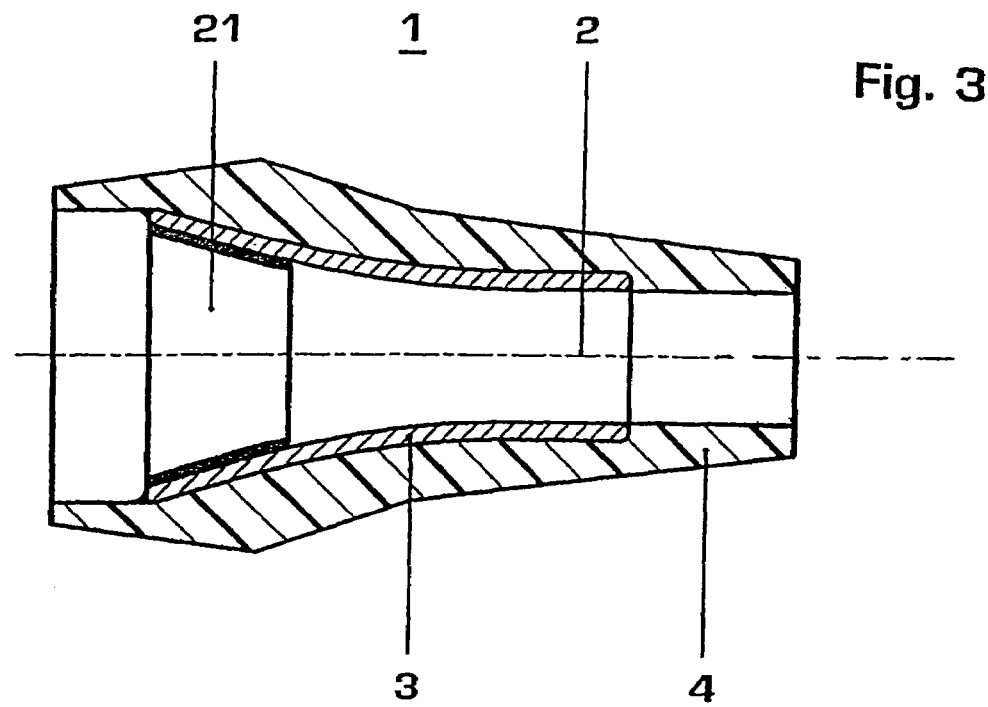
FIG. 3 is a top view of an axial cross section through a second embodiment of a rotationally symmetrically designed surrounding body according to an embodiment of the present invention.

A further possibility of varying the electrical resistance or the impedance of a cable element, such as of the cable head, along the axis of rotation 2 comprises a change of the wall thickness of the field control element 3. With increasing wall thickness the cross section surface increases, that is, the resistance parallel to the axis of rotation reduces. FIG. 3 illustrates a second embodiment of the surrounding body 1 according to the invention for use in a cable head, in which the field-controlling, nonlinear electrical properties are further influenced by the change in expansion and the change in the cross section along the axis of rotation. For solving field control tasks, in which relatively strong field gradients occur, such as in cables with operating voltages of more than 100 kV, appropriately designed field-controlling surrounding bodies are particularly suited.

Figure 4:
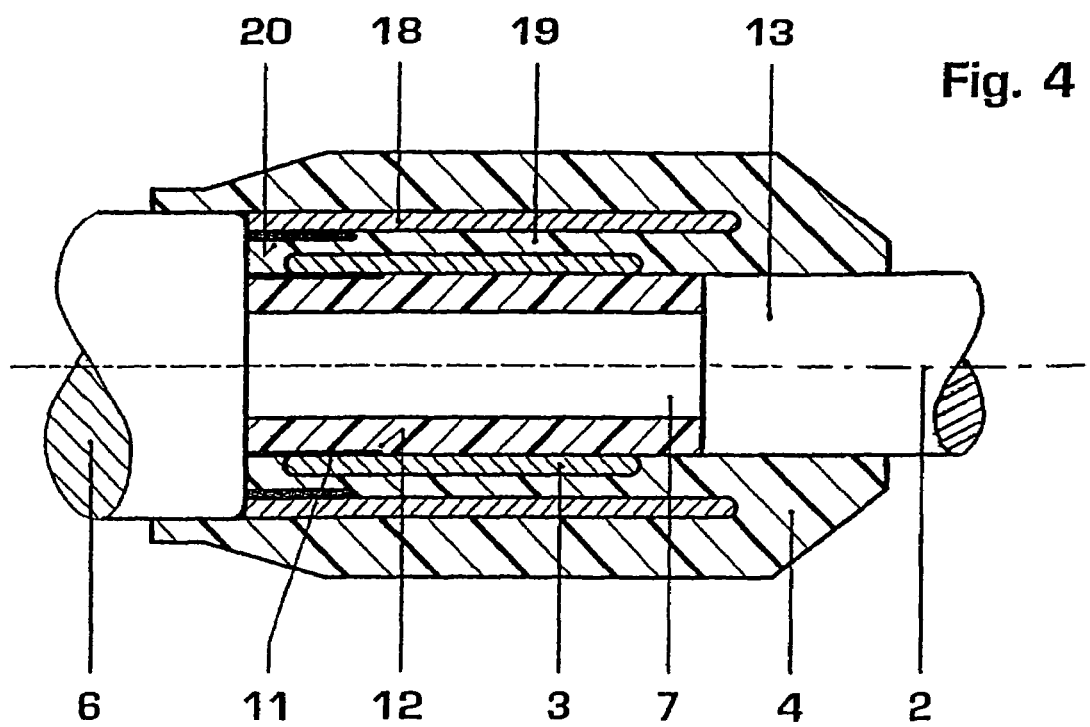
FIG. 4 is a top view of an axial cross section through a rotationally symmetrically designed cable head provided with a third embodiment of the surrounding body according to an embodiment of the present invention.

Yet another possibility for optimising field control in cable end seals or cable sleeves comprises the use of two field control elements arranged coaxially above one another and made of elastomeric material containing microvaristors. Here the field control elements 3, 18 are directly superposed if required, but in general are separated from one another by an insulation layer 19, as is shown in FIG. 4 in a third embodiment of the surrounding body according to the invention. The field control elements 3, 18 can be of different lengths and can be offset in the longitudinal direction, so that e.g. the outermost field control element 18 projects out over the innermost element 3. In addition to this, a layer 20 of electrically conductive material can be arranged between the field control element 18 and the insulating intermediate layer 19. This layer is formed advantageously by an electrically conductive elastomer or by a conductive lacquer. This layer 20 is either embedded in an electrically insulating manner in an insulation layer 19 separating both field control elements 3, 18 from one another, or is connected electrically conductively to the field control element 18 and due to its capacitive effect has a good field control function. Both field control elements 3 and 18 need not necessarily have the same electrical properties. Determined by different filler contents and by a different composition and sintering conditions of the microvaristors provided in the filler the electrical properties of both field control elements can differ quite substantially.

In order to separate the site of the highest electrical load from the offset edge 12 of the conductive layer 11 on the cable, it is recommended to apply an annular conductive layer 21 to the inside of the field control element 3 or to integrate it in the field-controlling material. Because of this layer the region of the highest electrical load does not coincide with the offset edge 12, but—depending on the length of the conductive layer 21—is shifted to the end of the cable.

The inventive surrounding body can be manufactured using processing machinery nowadays employed in elastomer compounding. The doped and sintered ZnO powder can be worked with a stirrer e.g. using LSR silicone as polymer matrix. When an EPDM or solid silicone is used the filler can be worked in the elastomer matrix by means of a rolling mill.

It is generally an advantage for the installation and application of the inventive surrounding body if the field control elements 3,18 and the insulation material of the support element 4 are produced together and can be drawn as one part over the cable end in the installation of the cable element designed as a cable head 5. Such a surrounding body 1 can be produced using production methods common in plastics processing, e.g. the injection-moulding process. An advantage here is that good adhesion of the different materials (field control element 3,18, support element 4, conductive intermediate layers 20, 21) can be adjusted by the production process (pressure, temperature, vulcanising time and use of adhesives) among one another and thus good dielectrical strength of the electrically highly stressed limiting surfaces can be achieved. Furthermore, any contamination of the limiting surfaces during installation of the elements can be excluded.

The manufacturing the surrounding body 1 according to FIG. 1 can be carried out as follows: a ZnO granulate doped with oxides of typically Bi, Co, Cr, Mn and Sb and selectively additional elements, such as Al, B, Fe, Ni, Si, is sintered at temperatures between 900° C. and 1300° C. The sintering process can take place e.g. in a rotary kiln or in a conventional batch oven. After sintering the resulting microvaristor powder can be sieved to a desired particle size fraction of for example 100 µm. Optionally, metallic additives can then be mixed in and sintered on the microvaristors. The sieved powder is worked e.g. on a rolling mill into an elastomer (e.g. into an HTV silicone). Depending on the type of elastomer other additives (such as e.g. cross-linking additives, stabilisers) can be added in at this point. The volume proportion of the sintered powder in the field control material is typically between 20 and 45 percent. The resulting compound can now be filled by a conventional casting or injection-moulding procedure or a pressing process into the desired form the elastomer can be cross-linked in the form. The resulting cross-linked field control element 3 is cast in a second injection-moulding procedure or casting process with the insulating material (e.g. liquid silicone rubber) to form the surrounding body 1.

Shielding necessary for external applications of the cable head can be cast directly with the support element 4, but can alternatively also be cast in a separate production process and later pushed onto the cable head. The advantages of the separately produced shieldings lie in greater flexibility in different applications (e.g. with different degrees of environmental contamination) and thus in more cost-effective production methods.

Instead of an elastomer any shrinkable polymer can be used, preferably a thermoplast. The different concentrations of microvaristors per surface unit or unit area distributed over the axis and thus particularly precise field control is then achieved with pre-specified configuring of the inner surface when the surrounding body is deformed in a shrinking procedure.

LEGEND

1 surrounding body
2 axis of rotation
3 field control element
4 support element
5 cable head
6 cable section
7 cable conductor
8 cable shielding
9 cable insulation
10 coil of wire
11 coating
12 offset edge
13 cable shoe
14,16 areas
15,17 sections
18 field control element
19 insulation layer
20,21 conductive layers

We claim:

1. A body for surrounding an end, a branching or a connecting point of a high-voltage cable section having a cable conductor, an electrically conductive cable shielding, a cable insulation and an offset edge separating a shielded and an unshielded area of the cable insulation, which the body includes:
   a first field control element comprising:
   an expandable or shrinkable polymer;
   a filler embedded in the polymer and comprising a plurality of microvaristors; and
   at least one section designed as a hollow truncated cone with an inner surface, which is designed differently than an outer surface of the cable section, wherein the inner surface of the hollow truncated cone is designed in such a way that after guiding the body on the outer surface of the cable section and fastening the body by expansion or shrinkage, the number of microvaristors per surface unit is smaller in a first section of the field control element surrounding the unshielded area of the cable insulation than in a second section of the field control element surrounding the shielded area of the cable insulation.

2. The body as claimed in claim 1, wherein an inner diameter determining the dimension of the inner surface changes constantly along the linear axis.

3. The body as claimed in claim 2, wherein the ratio of the minimum inner diameter to the maximum inner diameter of the inner surface is 0.2 to 1.0-fold.

4. The body as claimed in claim 1, wherein, in addition to the inner dimension of the inner surface, the wall thickness of the hollow body section changes along the axis.

5. The body as claimed in claim 1, wherein, in addition to the microvaristors, electrically conductive particles are also embedded in the polymer as the filler.

6. The body as claimed in claim 5, wherein the electrically conductive particles are applied to the microvaristors.

7. The body as claimed in claim 5, wherein the electrically conductive particles provided in the filler make up approximately 0.05 to approximately 5% by volume of the filler.

8. The body as claimed in claim 1, wherein an annular layer made of electrically conductive material is placed on or integrated into the inner surface of the hollow truncated cone of the first field control element, which extends in the direction of the axis only over a partial section of the first field control element.

9. The body as claimed in claim 1, wherein the field control element is formed in an inner surface of an elastically deformable support element made of insulating material.

10. The body as claimed in claim 9, wherein at least a second field control element surrounding the first field control element and separated from the latter by an electrically insulating layer is formed in the support element.

11. The body as claimed in claim 10, wherein the material of the second field control element has a polymer and a filler embedded in the polymer and containing at least one of the microvaristors and electrically conductive particles.

12. The body as claimed in claim 10, wherein the microvaristors of at least one of the first field control element and the second field control element are formed by sintering metal-oxide doped zinc oxide particles.

13. The body as claimed in claim 11, wherein the first and the second field control element have differing electrical properties as a result of choice of different fillers, filler concentrations and/or sintering conditions.

14. The body as claimed in claim 10, wherein a layer of electrically conductive material is placed between the first and the second field control element.

15. The body as claimed in claim 14, wherein the conductive layer is embedded in the insulation layer in an electrically insulating manner.

16. A cable element with a cable section comprising:
a cable conductor that can be conducted at high-voltage potential;
an electrically conductive cable shielding,
a cable insulation arranged between cable conductor and cable shielding, an offset edge separating a shielded and an unshielded area of the cable insulation; and
a surrounding body being placed on the cable section, and including a field control element which comprises:
a field control element comprising a plurality of sections made of an expandable or shrinkable polymer;
a filler embedded in the polymer of the field control element comprising a plurality of microvaristors; and
at least one section designed as a hollow truncated cone with an inner surface, which is designed differently than an outer surface of the cable section,
wherein the inner surface of the hollow truncated cone is designed in such a way that after the surrounding body has been placed on the outer surface of the cable section and fastened to the cable section by expansion or shrinkage, a number of microvaristors per surface unit in the field control element is smaller in a first section of the field control element surrounding an unshielded area of the cable insulation than in a second section of the field control element surrounding the shielded area of the cable insulation;
wherein the first section of the plurality of field control element sections encloses an offset edge of a layer of the cable shielding and an unshielded area of the cable insulation; and the second section connecting to the first section encloses a shielded area of the cable insulation.

17. The cable element as claimed in claim 16, wherein the first section of the plurality of field control element sections connects a coating of the cable shielding and the cable conductor to one another.

18. The cable element as claimed in claim 16, wherein the field control element further comprises at least one of a first field control element and a second field control element, which is surrounding the first field control element, wherein the first field control element and second field control element are guided in an axial direction over the offset edge and are connected only to the cable shielding.

19. The cable element as claimed in claim 18, wherein the second field control element is kept on a floating potential.

20. The cable element as claimed in claim 18, wherein, arranged between the first and the second field control element is an electrically conductive layer, which either is embedded in an electrically insulating manner in an insulation layer separating the two field control elements from one another, or is connected to the second field control element in an electrically conductive manner.

21. The cable element as claimed in claim 16, wherein an annular layer made of electrically conductive material is applied to the inner surface of the hollow truncated cone section of the field control element, which inner surface extends in the direction of the axis over the offset edge.

* * * * *